A. A. PAULY.
MOLDING APPARATUS.
APPLICATION FILED OCT. 28, 1911.
1,029,560.
Patented June 11, 1912.
5 SHEETS—SHEET 1.
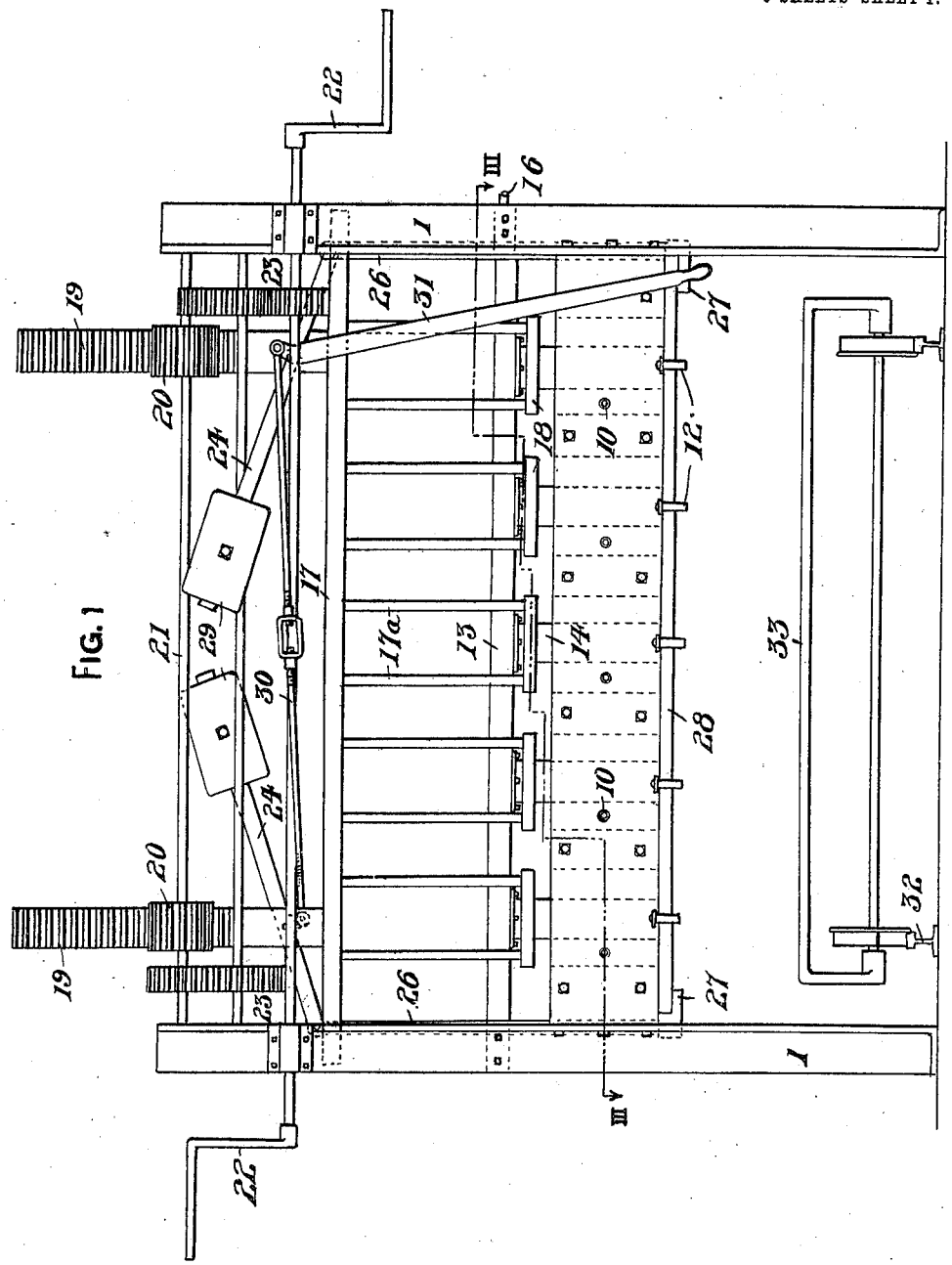

A. A. PAULY.
MOLDING APPARATUS.
APPLICATION FILED OCT. 28, 1911.
1,029,560.
Patented June 11, 1912.
5 SHEETS—SHEET 2.
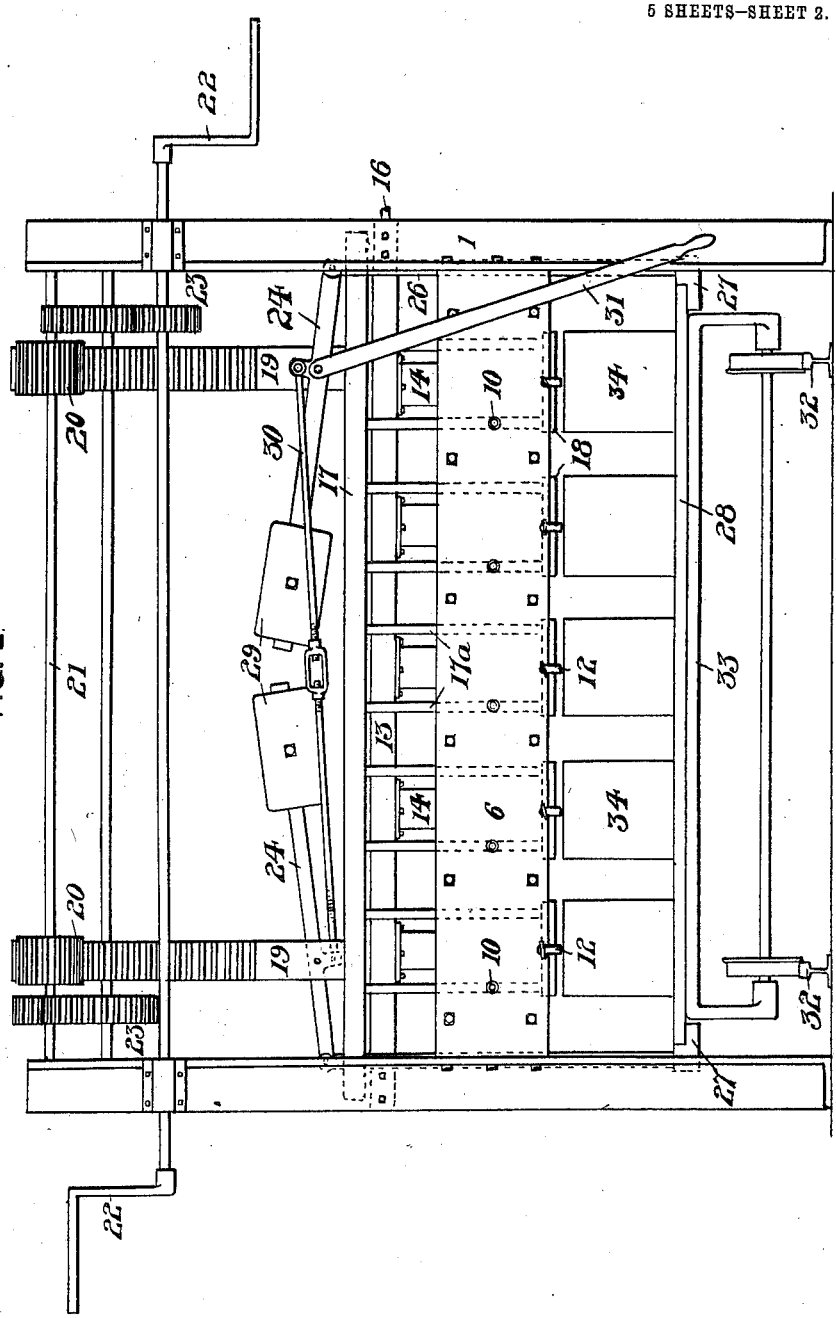
WITNESSES
INVENTOR.
Albert A. Pauly
BY F. N. Barber
ATTORNEY A. A. PAULY.
MOLDING APPARATUS.
APPLICATION FILED OCT. 28, 1911.
1,029,560.
Patented June 11, 1912.
5 SHEETS—SHEET 3.
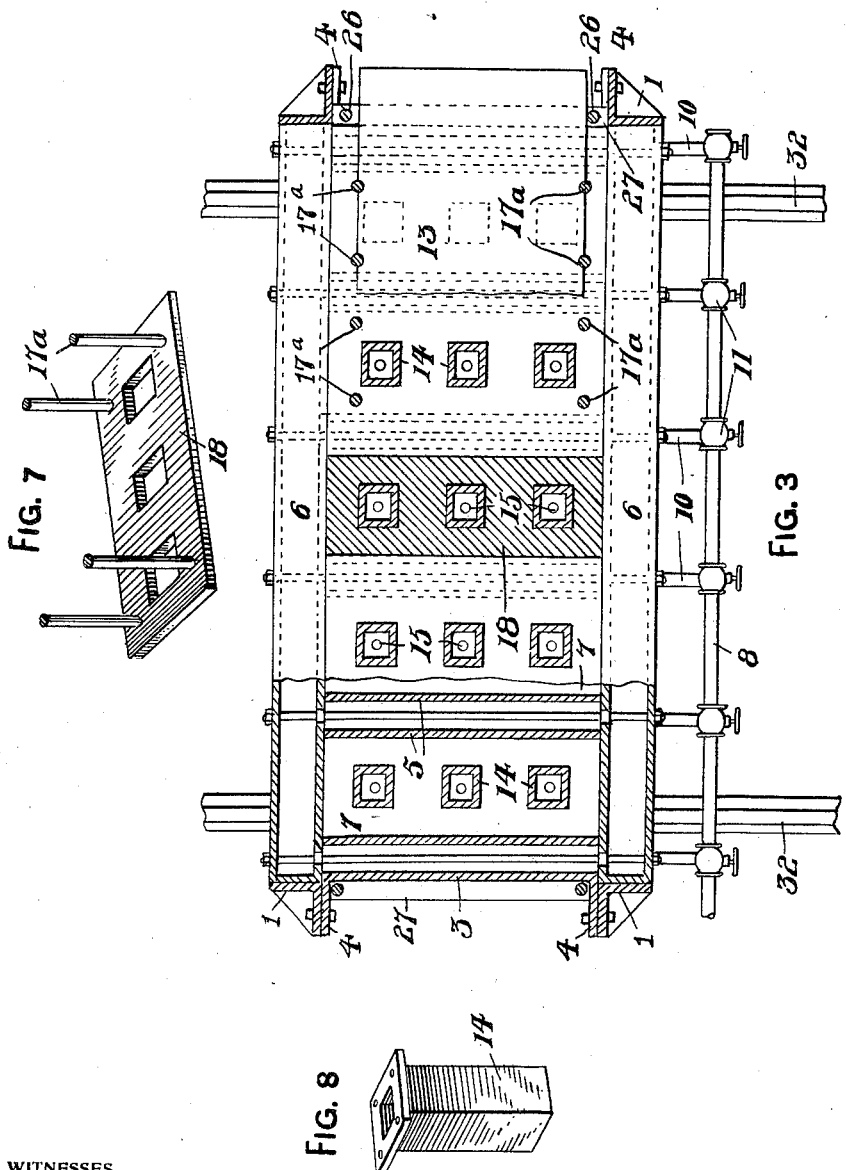
WITNESSES
INVENTOR
Albert A. Pauly
BY
ATTORNEY

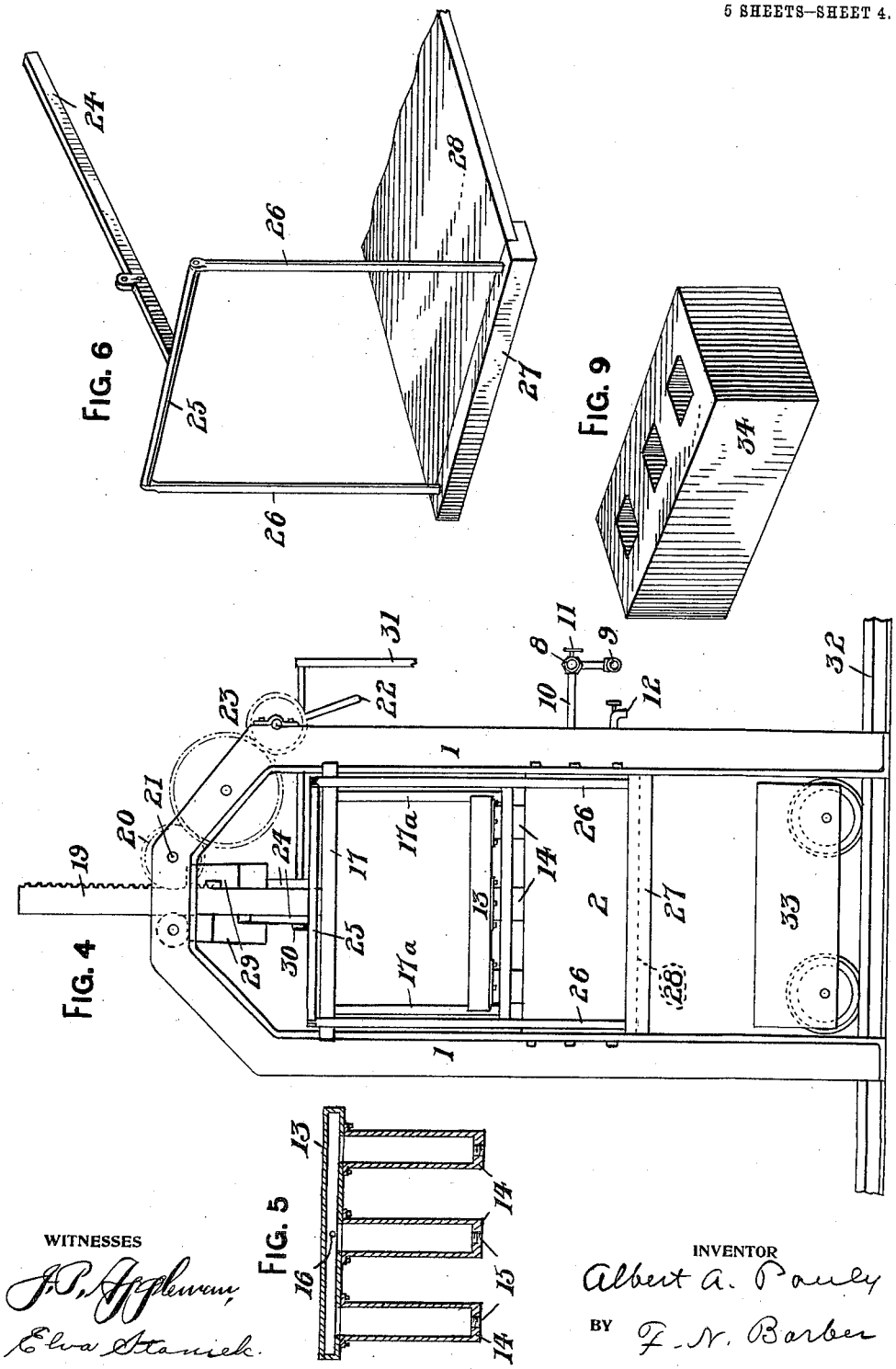

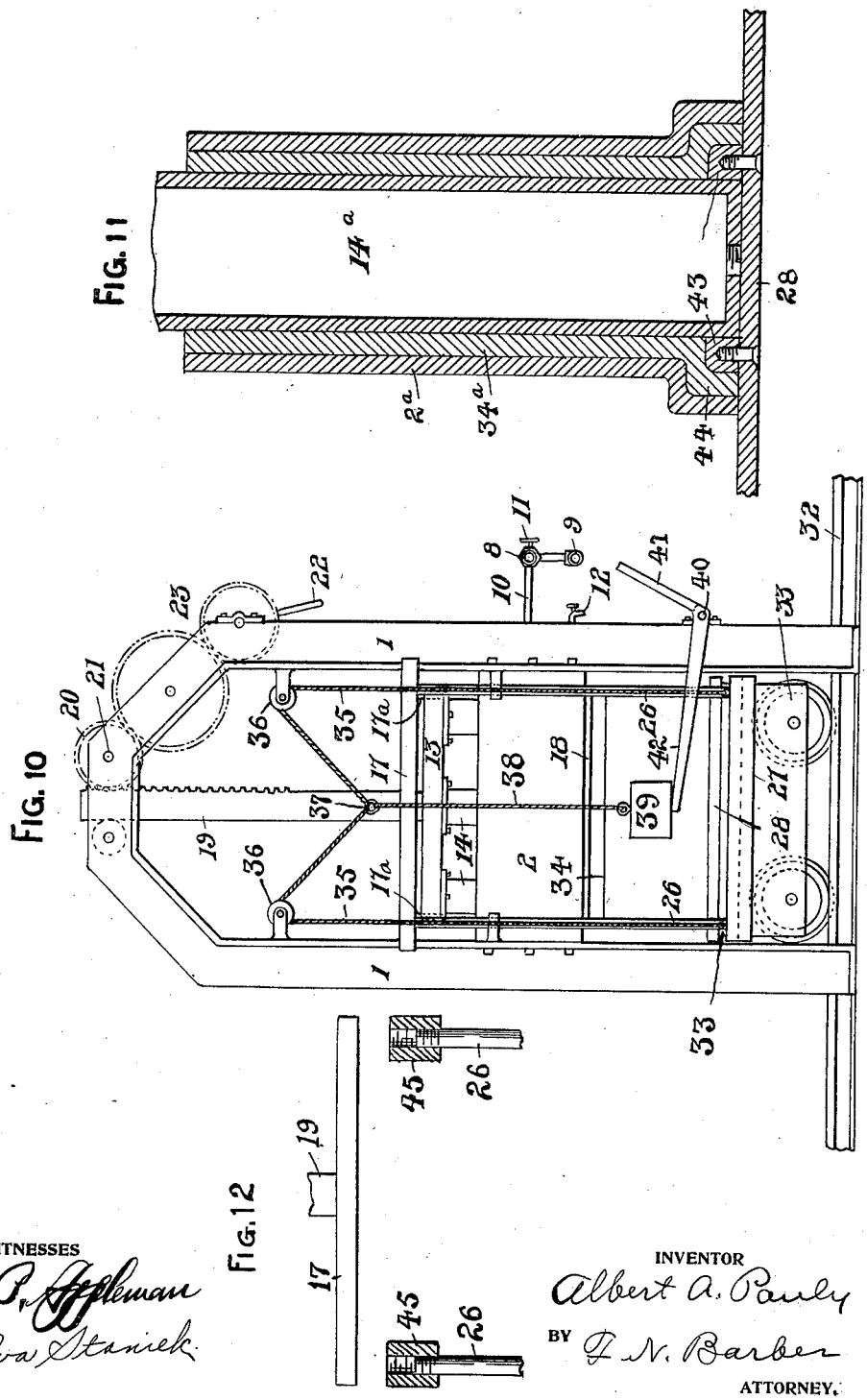

UNITED STATES PATENT OFFICE.

ALBERT A. PAULY, OF YOUNGSTOWN, OHIO.

MOLDING APPARATUS.

1,029,560.  Specification of Letters Patent.  Patented June 11, 1912.

Application filed October 28, 1911. Serial No. 657,243.

*To all whom it may concern:*

Be it known that I, ALBERT A. PAULY, a citizen of the United States, residing at Youngstown, in the county of Mahoning and State of Ohio, have invented new and useful Improvements in Molding Apparatus, of which the following is a specification.

My invention relates to apparatus for molding cementitious and similar articles.

The principal object thereof is to provide a simple and comparatively cheap molding apparatus constructed to support the weight of the molded articles during their downward ejection.

The apparatus illustrated on the drawings is designed for molding hollow blocks from cementitious material, such as Portland cement, and shows the apparatus substantially in the form in which I have built it for actual use.

Referring to the accompanying drawings, Figure 1 is a side view of my invention with the parts in position for molding. Fig. 2 is a similar view with the parts as they are when the article is discharged. Fig. 3 is a section on the line 3—3, Fig. 1. Fig. 4 is an end view of Fig. 1. Fig. 5 is a cross-section of the beam and cores. Fig. 6 is a view of one of the pallet holders and a portion of a pallet. Fig. 7 is a perspective of the ejector with the lower end of its actuating rods. Fig. 8 is a perspective of one of the cores. Fig. 9 is a perspective of an article which the apparatus shown is adapted to make. Fig. 10 is a modification of Fig. 4. Fig. 11 is a modification of a portion of a mold and die for drain tile. Fig. 12 is a view showing the preferred adjustable relations of the beam 17 to the rods 26.

On the drawings, 1 designates four corner posts, which may support the sectional mold body 2 in various ways. I have shown the transverse end sections 3 of the mold-body provided with vertical flanges 4 bolted to the end posts. The intermediate transverse sections 5 of the mold-body are arranged parallel to the end sections 3 and between the same. The longitudinal sections 6 of the mold body engage the ends of the transverse sections 3 and 5, to which they are tightly bolted. The several end, transverse and longitudinal sections divide the mold body into vertical mold spaces 7, their tops and bottoms being open except as hereinafter described.

8 is a steam pipe lying along one of the sections 6 and supplied with steam from the supply pipe 9.

10 are short steam pipes to convey steam from the pipe 8 to the hollow interior of the sections of the mold body. The pipes 10 preferably open opposite the ends of the hollow transverse sections 3 and 5, valves 11 being provided to control the steam to each of the pipes 10. The sections 6 are hollow from one closed end to the other and have lateral openings to form a steam connection with the hollow transverse members. A valved drainage pipe 12 is provided near the bottom of the mold body to discharge water condensed from the steam therein.

Secured to the posts 1 above and parallel to the mold body 2 is the hollow beam 13, to the under side of which are bolted the pendent hollow cores 14 extending down through the several mold spaces 7 with their lower ends in the plane of the bottom of the mold body. The beam 13 has openings to admit steam to the cores, which have closed lower ends provided with removable plugs 15, whereby the water of condensation in the cores may be discharged. The cores 14 are arranged so as to leave a molding space between them and the adjacent sections of the mold body and also between adjacent cores where more than one core is located in one mold space 7.

16 is the steam supply pipe for the beam 13.

Above and parallel to the beam 13 I place the vertically reciprocating cross-head or bar 17, to which I secure the vertical rods 17ª, which extend downwardly past the beam 13 and are secured to the pushers or ejectors 18, having the same shape and horizontal dimensions as the molded articles and surrounding the cores.

To the top of the cross-head 17, I secure means to actuate the same. Though many means may be devised for this purpose, I have shown two racks 19 having their lower ends connected to the cross-head, the racks gearing with the pinions 20 on the shaft 21 driven from the handles 22 through the intermediate system of gearing 23.

To the racks 19 I pivotally connect the levers 24 having their outer ends connected to cross bars 25, to which are suspended the vertical rods 26 supporting at their lower ends the transverse horizontal pallet-holders 27. These pallet-holders extend beneath the end sections 3 and slightly beneath the adjacent mold spaces so as to form seats or supports for the pallet 28 which closes the bottom of the mold during molding operations, and the weight of the molded articles during the ejecting operations. The inner ends of the lever 24 carry adjustable weights 29, which give the pallet an upward tendency sufficient to support the pallet and the articles while the latter are being molded and ejected. The levers are connected by the link 30 to cause them to operate in unison.

31 is a handle for actuating the levers 24 and connected mechanism.

Beneath the pallet I prefer to have some form of conveyer for the molded articles. I show below the pallet the track 32, on which cars, such as 33, may be operated. I show in Fig. 2 a car about to receive a pallet with molded articles therein.

The operation is as follows: The parts being as in Fig. 1 where the pallet 28 is held against the bottom of the mold body by force transmitted from the weights 29, and where the ejectors 18 are raised above the mold body, the cement is poured into the mold spaces around the cores, the sections of the mold body and the cores being supplied with steam. In a few minutes, the cement has, by the aid of the steam-heated mold body and cores, become sufficiently hardened or set to be ejected, whereupon the handles 22 are actuated to cause the cross-head 17 to be lowered. The first part of the movement of the cross-head brings the ejectors into engagement with the top of the molded articles in the mold spaces. During this part of the said movement the weights lower the inner ends of the levers 24, while they keep the pallet in its position against the mold body and cores. As soon as the ejectors reach the molded articles, their movement is transmitted to the molded articles which are then forced gradually downward while resting on the pallet, still held against their lower ends by the weights 29. During the ejection of the articles 34, one of which is shown in Fig. 9, the levers 24 move down with the cross-head and other connected parts without pivotal movement. When the articles have been entirely ejected from the mold body, the pallet soon reaches the core 33 (Fig. 2) and the handles 22 are stopped. An attendant then swings the handle 31 to the left, thereby causing the pallet holders 27 to be lowered, so that the pallet is wholly supported by the car, which is then pushed away on the track 32. Another pallet is placed on the holders 27 and the handles 22 are rotated so as to return the parts to the position shown in Fig. 1.

In Fig. 10, I have omitted the weights 29, the levers 24, the link 30, and the handle 31, and shortened the rods 26 and located them so that their upper ends will be engaged by the cross-head as soon as the ejectors have engaged the article in the mold body. To the pallet-holders 27 at each end of the machine I secure the cables, or ropes 35 which pass up over the sheaves 36, to a common point 37, from which depends the rope or cable 38 having the weight 39 thereon. The weight 39 preferably counterbalances the weight of the holders 27, the pallet 28, the rods 26, and the molded articles 34, and keeps the pallet 28 in contact with the bottom of the mold-body during the molding operations, and with the articles 34 during the ejecting operations. During the ejecting of the articles the weight 39 rises to a position opposite the rock shaft 40, which has the operating handle 41, and the arm 42, the latter being adapted to engage the bottom of the weight 39. Preferably the tops of the rods 26 are provided with threaded sleeves 45 so that the space which the cross head 17 must travel before actuating the rod 26 may be adjusted. When the pallet with the articles 34 thereon reaches the car 33 (Fig. 10), the lever 41 is moved to the right to cause the arm 42 at each end of the machine to engage the weights 39 and lift them slightly, thereby permitting the pallet-holder 27 to drop slightly below the pallet 28, so that the car with the pallet and articles thereon may be run along the track 32 to make room for another car. Another pallet is placed on the holders 27 and the lever 41 returned to the left, permitting the weight to move the pallet into engagement with the bottom of the mold-body. I have not deemed it necessary to illustrate both ends of the machine with the modifications shown in Fig. 10, because both ends are alike, the shaft 40 connecting the arms 42.

In Fig. 11, I have shown the core 14$^a$ and the mold-body 2$^a$ adapted to the making of clay drain tiles, a ring 43 being secured to the pallet 28 by the screws to form the inner shoulder of the bell 44 on the tile 34$^a$.

It is evident that changes may be made in the details and their combination without departing from the spirit of my invention. Accordingly, I desire to cover all such changes so far as the claims will permit the same.

I claim—

1. In a molding apparatus, a mold-body having mold-spaces with open lower ends, a pallet to close the bottom of the mold-spaces, an ejecting means to push the molded articles downwardly through the mold-body, a support for the pallet, and means carried by the ejecting means having a yielding upward tendency and for holding the said support against the pallet during the ejection of the articles.

2. In a molding apparatus, a mold-body having mold-spaces with open lower ends, a pallet to close the bottom of the mold-spaces, an ejecting means to push the molded articles downwardly through the mold-body, a support for the pallet, and means for giving a downward movement to the support independently of the ejecting means at the close of the ejecting operation.

3. In a molding apparatus, a mold-body having an open bottom, a pallet having a yielding upward tendency, a conveyer below the pallet and spaced therefrom, and means for pushing a molded article downwardly through the mold-body and against the yieldable pallet until the pallet rests on the conveyer.

4. In a molding apparatus, a mold-body having an open bottom, a pallet closing the bottom of the mold-body, a pallet-rest below the pallet and spaced therefrom, means for ejecting a molded article downwardly through the mold-body and delivering the pallet with the article thereon to the rest, and means for supporting the pallet and giving it a yielding upward tendency while the first means is operating.

5. In a molding apparatus, a mold-body having an open bottom, a pallet closing the bottom of the mold-body, a pallet-rest below the pallet and spaced therefrom, means for ejecting a molded article downwardly through the mold-body and delivering the pallet with the article thereon to the rest, means for supporting the pallet and giving it a yielding upward tendency while the first means is operating, and means for removing the pallet-supporting means out of contact with the pallet when the pallet is lowered upon the said rest.

Signed at Pittsburgh, Pa., this 16th day of October, A. D. 1911.

ALBERT A. PAULY.

Witnesses:
F. N. BARBER,
ANNA R. BEATTY.

---

Copies of this patent may be obtained for five cents each, by addressing the "Commissioner of Patents, Washington, D. C."